Oct. 17, 1961     C. T. YOUNG     3,004,308
THRESHOLD STRUCTURE
Filed Dec. 10, 1957
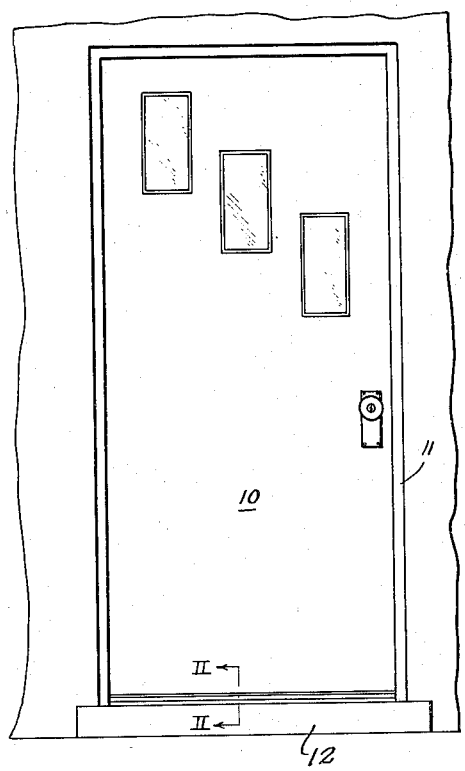
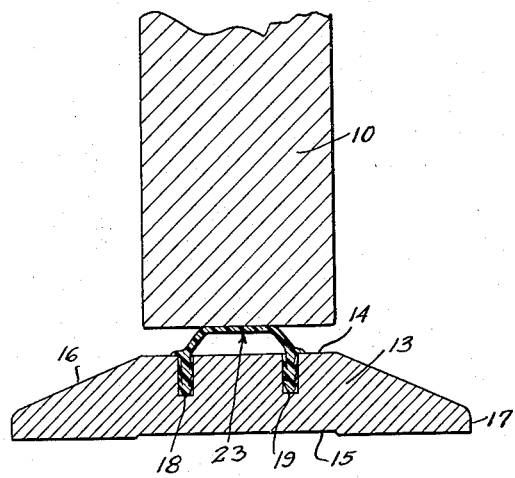
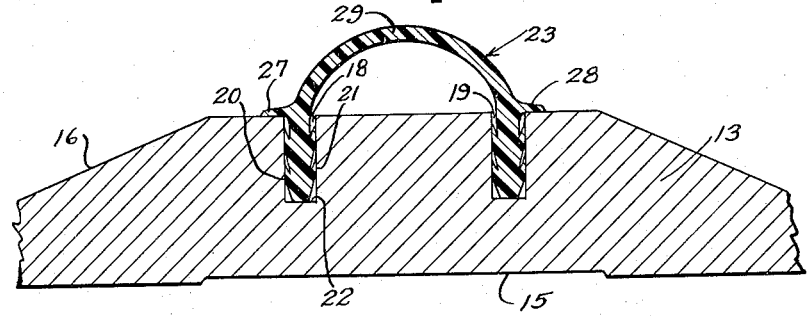
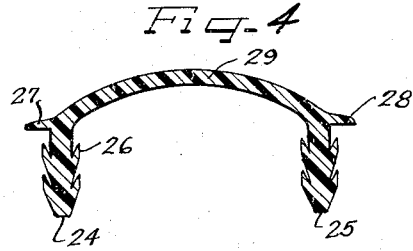
Inventor
Conrad T. Young
by Hill, Sherman, Meroni, Gross & Simpson Attys.

United States Patent Office 3,004,308
Patented Oct. 17, 1961

3,004,308
THRESHOLD STRUCTURE
Conrad T. Young, 522 S. Main St., Beaver Dam, Ky.
Filed Dec. 10, 1957, Ser. No. 701,799
5 Claims. (Cl. 20—64)

The present invention relates broadly to threshold constructions, and is more particularly concerned with a new and improved door sealing structure featuring a readily deformable sealing strip in combination with a grooved threshold to prevent the passage of air between the door and threshold and damage to the latter by entrapped moisture.

Numerous threshold and door sealing constructions of various types are of course known to the art; however, many of these possess certain practical disadvantages. As for example, one type employs a formed metal strip which is first secured to the threshold and the sealing strip then inserted therein. Since both strips are shaped to a particular matching configuration, the fabrication time is often rather lengthy and the installation sometimes difficult. Further, there are other constructions which expose portions of the threshold to moisture, and rotting may ultimately occur therein. In addition, sealing strips are available to the trade which are securely attached to the threshold upon installation; however, with this type a removal problem arises when replacement is required.

It is therefore a primary aim of the present invention to provide a combination of a threshold and sealing strip which avoids the disadvantages of earlier known constructions, and which may be manufactured and installed at a relatively low cost.

Another object of this invention lies in the provision of a threshold having spaced grooves and a sealing strip having leg portions received therein, the strip being further characterized by wing portions located generally flush with the threshold upper surface to prevent the entrance of moisture into the threshold grooves.

Another object of the invention is to provide a sealing strip combined with a grooved threshold, the strip having barbed leg portions located in the threshold grooves to resist accidental dislodgment by objects moving thereover.

Another object of the present invention is to provide a threshold and sealing strip to prevent passage of air and other elements between the threshold and door, the strip being readily deformable and providing when the door is closed thereupon a broad contact surface with said door, and yet when free of compression, only a slight protuberance from the threshold upper surface and therefore presenting no tripping hazard problem.

A further object of this invention is to provide a threshold having a pair of spaced grooves in the upper surface thereof and a deformable plastic sealing strip having barbed leg portions substantially entirely received in the grooves, the leg portions being joined at their upper ends by a generally semi-circular connecting portion and also having at said ends lip or wing portions extending outwardly therefrom and in flush contact with the threshold upper surface.

Other objects and advantages of the invention will become more apparent as the description proceeds, particularly when taken in connection with the accompanying drawings.

In the drawings, wherein like numerals are employed to designate like parts throughout the same:

FIGURE 1 is a front elevational view of a typical door construction and showing applicant's threshold and sealing strip combination located therebeneath;

FIGURE 2 is a vertical sectional view taken substantially along the line II—II of FIGURE 1;

FIGURE 3 is a sectional view of the threshold and sealing strip combination of this invention, and showing the configuration of the strip when the door is not located thereupon; and FIGURE 4 is a sectional view of the sealing strip itself prior to installation in the threshold.

Referring now to the drawings, there is shown in FIGURE 1 a typical door and frame construction with which the present invention may be employed. The customary arrangement includes a door 10 supported in a frame 11, while between the lower ends of the frame is a sill 12 to which the saddle and carpet strip or threshold 13 is secured. Other expressions in the art are of course synonymous with the word threshold; however, as used herein the word "threshold" designates a wood or other member normally attached to the sill and defining the bottom portion of the door opening.

For the purposes of this invention, it is preferred that the threshold 13 be of wood, and any wood of good wearing qualities such as oak is suitable. The threshold 13 is normally shaped to include generally parallel top and bottom surfaces 14 and 15, respectively, as well as sloping shoulder surfaces 16 from which depend side walls 17. Located substantially equidistantly from the side walls and spaced inwardly thereof are longitudinally extending grooves 18 and 19. Each of the grooves are cut downwardly from the threshold upper surface 14 to a distance of approximately one-half of the thickness of said threshold, and are shaped to include generally parallel side walls 20 and 21 and an essentially flat bottom 22.

Snugly received within the grooves 18 and 19 of the threshold 13 is a sealing strip 23, which preferably is extruded from vinyl, rubber or any other suitable plastic material. A vinyl base material has proven most effective to date, however, by reason of its relatively low cost and excellent wearing characteristics.

Referring now particularly to FIGURE 4, which shows the strip 23 separate from the threshold, it is to be noted that said strip is shaped to include a pair of spaced leg portions 24 and 25 arranged generally parallel to one another and provided along their inner and outer side walls with a plurality of upwardly and generally obliquely extending barbs 26. Experience has shown that two or three longitudinally extending rows of barbs 26 are adequate to make the desired gripping contact with the side walls 20 and 21 of the grooves 18 and 19, and thus to effectively resist an accidental displacement of the sealing strip 23 when persons or objects move thereagainst.

Upwardly of the leg portions 24 and 25 of the strip 23 protruding generally outwardly therefrom are wing or lip portions 27 and 28, while provided between said leg portions is a generally semi-circular connecting portion or bridge 29. The wing or lip portions 27 and 28 extend outwardly from the point of juncture of the bridge and leg portions and are disposed in generally perpendicular relation to said leg portions. It will be further seen that when the sealing strip 23 is installed in the threshold 13, as illustrated in FIGURES 2 and 3, the wing portions 27 and 28 lie generally parallel to and in close contact with the upper surface 14 of the threshold. By provision of the wing portions arranged as shown, it has been found relatively impossible for moisture and other elements to penetrate into the grooves 18 and 19 and cause rotting or other damage to the threshold 13. Particularly is this the case since the area of the threshold upper surface 14 beneath the connecting portion 29 is completely shielded thereby.

A comparison of FIGURES 3 and 4 will show that the leg portions 24 and 25 are spaced relatively more closely to one another upon installation in the grooves 18 and 19 of the threshold, and further, that the bridge or connecting portion 29 increases in radial curvature when the strip 23 is installed as in FIGURE 3.

This has the advantage of providing a greater degree of compressibility in the connecting portion, which in turn allows a much broader contact surface area to be presented to the bottom of the door as is shown in FIGURE 2. The sealing characteristics of the structure are accordingly improved.

The grooves 18 and 19 in the threshold 13 may be provided by any suitable grooving machine known to the woodworking art, and the threshold secured to the sill 12 in the customary manner. The sealing strip of FIGURE 4 may then be installed, and this is readily accomplished by merely pressing inwardly on the strip 23 adjacent the wing portions 27 and 28 to align the leg portions 24 and 25 with the threshold grooves. Having located the ends of the leg portions of the strip at the entrance to the grooves 18 and 19, it is then merely necessary to press downwardly on the strip 23 generally above the wing or lip portions 27 and 28 thereof. The pressing action is continued along the length of the sealing strip, and it will be found that the leg portions will readily enter and seat in the grooves and that the wing portions 27 and 28 will be in firm contacting relation with the upper surface 14 of the threshold. After installation in substantially the manner indicated, the sealing strip 23 will be in position with respect to the threshold as clearly shown in FIGURE 3.

It may be seen from the foregoing that applicant has provided a sealing strip which may be readily formed by extrustion or other methods at minimum cost, and which can be readily installed by only a single person. The strip does not require the use of intermediate metal members as has often been the practice in the past, and when installed as shown in FIGURE 3, cannot readily be dislodged from its proper position. Passage of air inwardly or outwardly of the door is effectively prevented by the herein disclosed combination of a threshold and sealing strip, this being in a large measure accomplished by the board contact surface area between the sealing strip and bottom of the door. Further, the threshold itself is not exposed to the entrance of moisture since the connecting portion 29 of the sealing strip shields the area of the threshold located thereunder, while the wing or lip portions 27 and 28 seal the grooves 18 and 19 outwardly thereof against the infiltration of moisture likely to induce rotting. The barbed portions 26 extending entirely along the length of the legs 24 and 25 readily compress inwardly during insertion of the strip in the threshold, and yet after installation provide a firm resistance to accidental displacement of the strip from the threshold.

It is to be understood that the form of the invention herein shown and described is to be taken as the preferred embodiment of the same, and that various changes in the size, shape and arrangement of parts may be effected without departing from the spirit of the invention or the scope of the subjoined claims.

I claim as my invention:

1. A threshold and sealing strip combination of the character described, comprising a one-piece threshold member of solid block construction having spaced generally parallel grooves provided with straight sides and a substantially flat bottom therebetween and a sealing strip having a generally semi-circular portion extending upwardly from the upper surface of the threshold member and leg portions depending downwardly from the semi-circular portion and substantially entirely received within the grooves with the lower ends of the leg portions normally in contact with the flat bottom in said grooves, said sealing strip further including wing portions integral with the semi-circular portion and extending outwardly from the point of juncture of the semi-circular portion with the leg portions in generally perpendicular relation to said leg portions and lying against the upper surface of the threshold member to prevent the entrance of moisture into the grooves, the depth of the grooves closely approximating the height of the semi-circular portion from the threshold.

2. A threshold and sealing strip combination of the character described, comprising a one-piece threshold member of solid block construction having spaced generally parallel grooves provided with straight sides and a substantially flat bottom therebetween, and a sealing strip having a generally semi-circular portion extending upwardly from the upper surface of the threshold member, and leg portions depending downwardly from the semi-circular portion and substantially entirely received within the grooves with the lower ends of the leg portions normally in contact with the flat bottom in said grooves, said leg portions having barbs extending upwardly from the inner and outer side walls thereof in contact with the sides of the grooves to resist upward movement of the sealing strip from said grooves, said sealing strip further including wing portions integral with the semi-circular portion and extending outwardly from the point of juncture of the semi-circular portion with the leg portions in generally perpendicular relation to said leg portions and lying against the upper surface of the threshold member to prevent the entrance of moisture into the grooves, the depth of the grooves closely approximating the height of the semi-circular portion from the threshold.

3. A readily deformable plastic strip for effecting sealing contact between a door and a grooved threshold, comprising, as manufactured, a normally curved bridge portion and integral generally parallel leg portions normally depending downwardly therefrom to be essentially entirely received in the grooves of the threshold, said leg portions having inner and outer side walls and barbs extending generally obliquely upwardly therefrom, thereby resisting accidental dislodgment of the sealing strip from the grooves of the threshold, and a lip portion extending outwardly from the upper end of each leg portion in substantially perpendicular relation thereto to be located in close flush fitting relation with the threshold, forming a seal between the grip and threshold and preventing moisture entry into the grooves therein.

4. A readily deformable plastic sealing strip for effecting sealing contact between a door and a threshold located thereunder, comprising, as manufactured, a normally curved bridge portion normally pressed downwardly by said door, integral generally parallel leg portions normally depending downwardly from the bridge portion, said leg portions having inner and outer side walls and barbs extending upwardly therefrom to resist accidental dislodgment of the sealing strip from the threshold, and wing portions also integral with the bridge portion and extending outwardly from the point of juncture of the bridge portion with the leg portions in generally perpendicular relation to said leg portions, the strip when installed having a bridge portion the height of which closely approximates the height of the leg portions.

5. A threshold and sealing strip combination of the character described, comprising a one-piece threshold member having spaced generally parallel grooves provided with straight sides and a substantially flat bottom therebetween and a sealing strip having a generally semi-circular portion extending upwardly from the upper surface of the threshold member and leg portions depending downwardly from the semi-circular portion and substantially entirely received within the grooves with the lower ends of the leg portions normally in contact with the flat bottom in said grooves, said sealing strip further including wing portions integral with the semi-circular portion and extending outwardly from the point of juncture of the semi-circular portion with the leg portions in generally perpendicular relation to said leg portions and lying against the upper surface of the threshold member to prevent the entrance of moisture into the grooves, the depth of the grooves closely approximating the height of the semi-circular portion from the threshold.

(References on following page)

References Cited in the file of this patent

UNITED STATES PATENTS

| | | |
|---|---|---|
| 2,139,329 | Fessler | Dec. 6, 1938 |
| 2,220,695 | White | Nov. 5, 1940 |
| 2,345,273 | Macklanburg | Mar. 28, 1944 |
| 2,575,094 | Chamberlain | Nov. 13, 1951 |
| 2,718,677 | Cornell | Sept. 27, 1955 |
| 2,846,736 | Quoss | Aug. 12, 1958 |